Nov. 15, 1966  R. H. PALM, SR., ETAL  3,285,448
HOPPER AND TRAILER LIFT MECHANISM
Filed Nov. 16, 1964  3 Sheets-Sheet 1
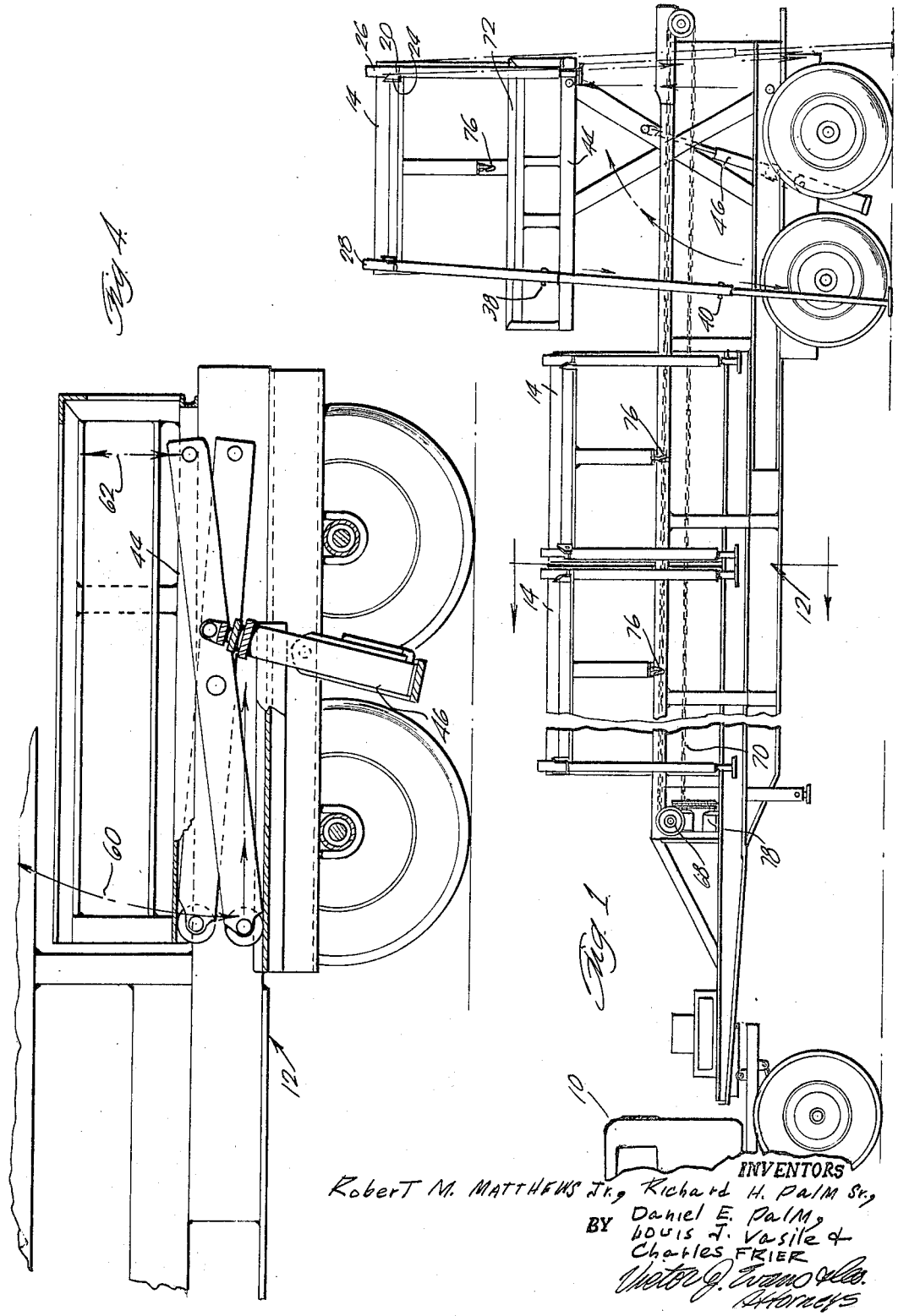
INVENTORS
Robert M. Matthews Jr., Richard H. Palm Sr.,
Daniel E. Palm,
BY Louis J. Vasile &
Charles Frier
Victor J. Evans &co.
Attorneys

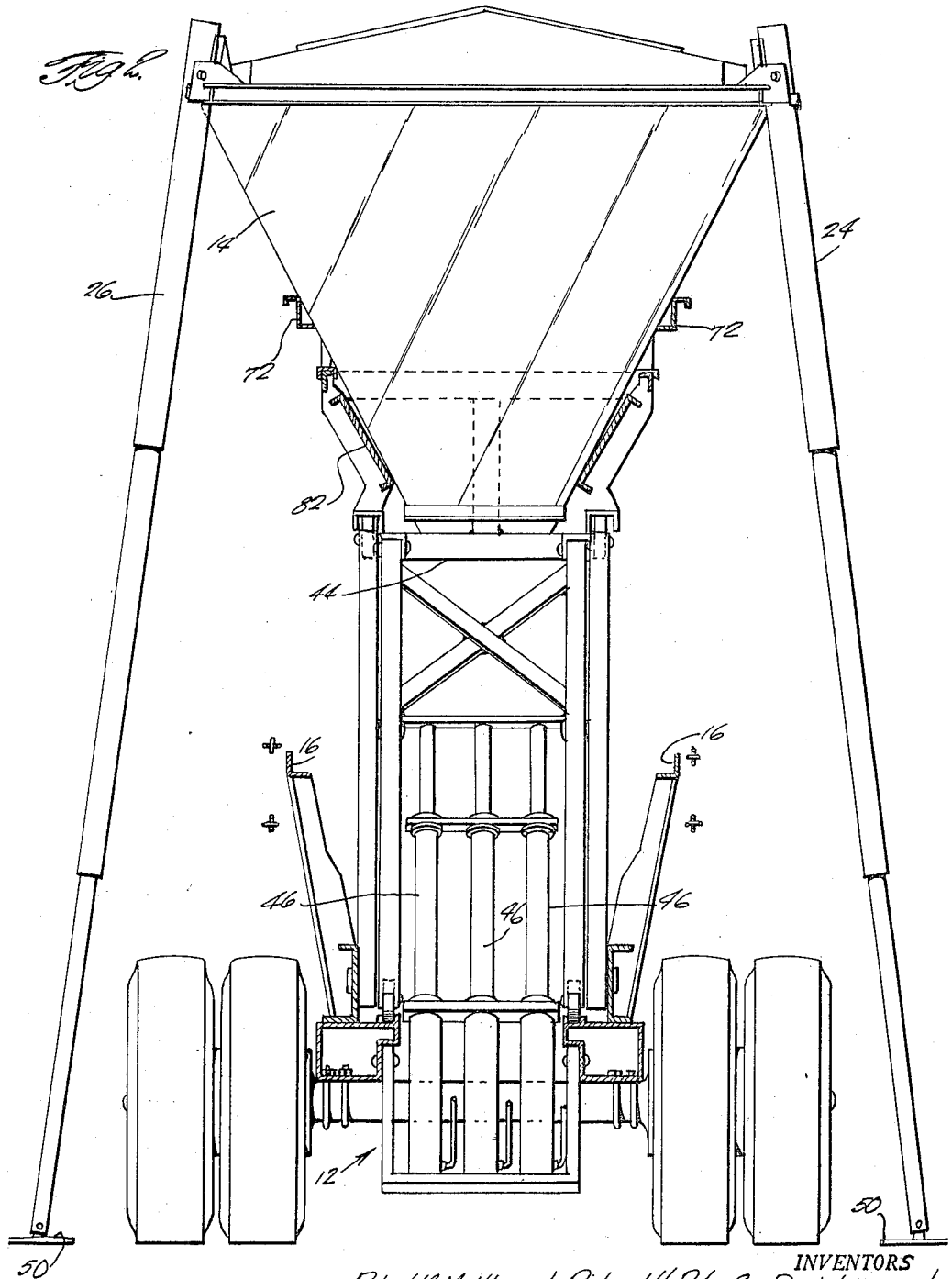

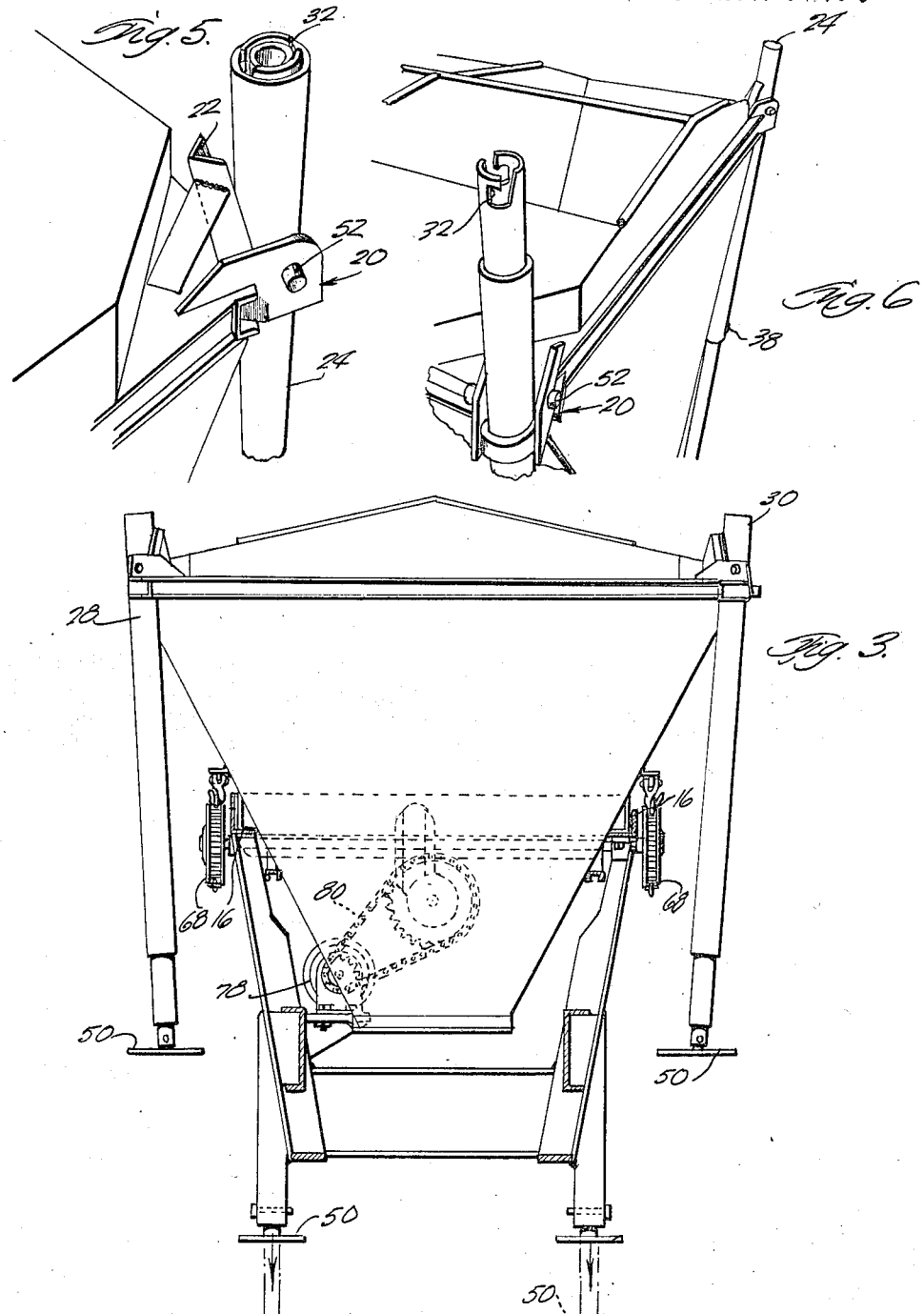

United States Patent Office 3,285,448
Patented Nov. 15, 1966

3,285,448
HOPPER AND TRAILER LIFT MECHANISM
Richard H. Palm, Sr., and Daniel E. Palm, Reading, Pa., and Louis J. Vasile, Charles Frier, and Robert M. Matthews, Jr., Okeechobee, Fla., assignors to Ranch Fertilizer Co., Inc., Okeechobee, Fla.
Filed Nov. 16, 1964, Ser. No. 411,295
5 Claims. (Cl. 214—512)

The invention relates to an improved construction for a hopper and lift mechanism provided for trailers, and has as one of its paramount objects the provision of a combined mechanism for traversing a hopper along the length of the trailer, lifting the hopper from the trailer by a lift mechanism secured on the trailer, and positioning the hopper into an upstanding position by telescopically configured standing means for the hopper, as well as providing pin and bayonet couplings in the telescopically constructed legs so that the lift mechanism may release the hopper from being supported thereby.

The telescopic legs and bayonet coupling thereof are provided to be mounted from a trunion mount and brace unit for the legs.

Therefore, an object of the present invention is to provide a compact and composite system of construction so that a hopper may be moved along the length of the trailer by mechanical means, selectively lifted from the trailer by a mounted lift mechanism thereof, and may be securely positioned in selective attitudes with respect to the lift mechanism so that the hopper may be usefully and gainfully used separately and distinct from the trailer and lift mechanism thereof.

The above and other objects and advantages of the invention will become apparent upon full consideration of the following detailed description and accompanying drawings of the invention in which:

FIGURE 1 is a broken away view of a side elevational view of a portion of a cab and a trailer in which several hoppers are mounted for transport on the trailer and one of the hoppers is being mounted in its vertical position with the legs in an extended array in accordance with the preferred embodiment of the invention.

FIGURE 2 is a rear elevational view on an expanded scale showing the improved lift mechanism of the present invention in which the hopper is shown in the raised position with the telescopically constructed legs are also in an extended array for supporting the hopper upon release of the lift mechanism from supporting the hopper in accordance with the invention.

FIGURE 3 is a cross-sectional front elevation view of the hopper being carried on the trailer and taken essentially along lines 3—3 of FIGURE 1 but on an enlarged scale.

FIGURE 4 shows a side elevational view of the rear portion of the trailer in which the lift mechanism which is shown in FIGURE 2 in its extended or lift position is shown in the retracted position, and in which there are provided arrows showing the direction in which the elements are extended into the lift position.

FIGURES 5 and 6 show respectively perspective views of the trunnion mount and brace for the legs of the hopper in accordance with a preferred embodiment of the present invention, and provide essentially a detailed view of the trunnion mount and brace as generally shown in the other figures. Referring now more particularly to the drawings, there is shown a cab 10 and a trailer 12 on which are mounted a plurality of hoppers 14, 14, 14 for carrying bulk material.

The hoppers 14 are mounted on a pair of rails or tracks 16, 16 as more particularly shown in FIGURE 3 from the end view thereof, and it is seen that the hoppers have depending from each of the corners thereof a trunnion mount 20 and a brace 22 for each of the legs 24, 26, 28, 30. The legs are constructed of sections of telescopically engaging pipe or tubes, and they are coupled to each other by a bayonet receptacle 32 positioned at the upper end of each of the inner space tubes of the legs 24–30, and are held in physical relationship to each other by a pin 38, 40 that is provided in each of the outer tubes and positioned a short distance from the end thereof.

In FIGURES 1 and 2 there is shown that a lift mechanism 44 is actuated by a hydraulic means 46 for extending the hopper that may be loaded on the lift mechanism 44 into its raised position as shown in each of FIGURES 1 and 2. The hopper 14 on the lift mechanism 44 is lifted out of the tracks 16, 16 which carry the hopper when being transported, and the lift mechanism 44 in being extended by the hydraulic means 46 lifts the hopper 14 into an extended and raised position. Since the legs 24, 26 as well as legs 28, 30, depend from the respective corners of the hoppers, they are allowed to depend until the telescopic components of the legs are allowed to be extended and secured in place by the pins 38, 40 as described hereinabove. At the free ends of the legs 24–30, there are resting plates 50 to provide support means for the legs being precluded from sinking downwardly into the surface upon which they rest. As the hopper is being readied for its separate support from its own legs 24–30, the legs are positioned into their respective braces 22, such as shown in detail in FIGURE 5, so that the trunnion mount provides the maximum mechanical advantage in supporting the hopper. FIGURES 5 and 6 respectively show the leg 24 being positioned into the brace 22, and the details of the trunnion mount 20 including a pin 52 upon which the leg is adjusted in being relocated from its substantially vertical and depending position into the inclined relation as it rests in the brace 22. After the legs 24–30 are properly and completely arranged for supporting the hopper 14, as shown in FIGURE 2, then the lift mechanism 44 may be retracted into its lowermost position as shown in FIGURE 4, for example, and then the trailer 12 may be removed from under the hopper as the hopper 14 stands alone. FIGURE 4 more particularly shows arrows 60, 62 in which the linkages of the lift mechanism 44 are caused to move in being raised, and the same relative strokes are also provided in the downward movement of the lift mechanism as it is restored to its retracted position.

There is shown in detail in FIGURE 1 a winch 68 and an endless chain 70 for moving the hoppers to and from the lifting mechanism 44 along the track 16. There is mounted on the side of the hopper a track engaging means 72, 72 as well as a chain engaging means 76 on each of the hoppers for securing the hoppers to the chain as it is desired to move the hoppers along the tracks 16, 16. The winch is powered by a hydraulic motor 78 which drivingly engages the winch 68 by another endless chain 80.

The embodiment shown in FIGURE 2 shows the hopper in which the gates 82 are latched up so that a fertilizer spreader truck may pull out from under the hopper after loading up with fertilizer from the hopper 14, for example.

FIGURES 5 and 6 particularly show the pin engaging section or bayonet arrangement 32 which is at the top of the middle and lower portions of the legs 24–30, respectively. The sections are locked together by the pin 38–40 by lifting up and turning in a clockwise direction. The center section of the leg may be assembled into its distended or extended position while the hopper is in an intermediate lift position. The hopper may then be raised all the way up by the lifting mechanism 44 and a pin is placed through the center section of the legs so that they are in their full extended position as shown in FIGURE 2. In lowering the hopper, it is first raised a small amount and then the pins are correspondingly removed from each of the sections. By virtue of the bayonet type construction 32, there is no precise need for lining up apertures or holes in each of the engaging sections of the telescopically constructed legs 24–30.

Additional embodiments of the invention in this specification will occur to others and, therefore, it is intended that the scope of the invention be limited only by the appended claims and not by the embodiments described hereinabove. Accordingly reference should be made to the following claims in determining the full scope of the invention.

What is claimed is:

1. A trailer-hopper arrangement having means for transporting hoppers and for erecting a hopper upon a mounting means comprising an elongated trailer having a pair of tracks longitudinally disposed thereon for mounting a plurality of hoppers thereon, a drivable chain means to displace the hoppers along said track, a lift mechanism mounted on the trailer to move a hopper with respect to the trailer along a vertical path with respect to the plane of the trailer, each of said hoppers having telescopically constructed leg arrangements to distend into a supporting arrangement for holding the hopper in an upper location after the lift mechanism has displaced the hopper to said position and said legs holding the hopper in said position when the lift mechanism has been removed therefrom, the telescopic sections engaging each other in a bayonet and pin arrangement for facilitating the erection of the supporting arrangement, and each of the hoppers being provided at the corners thereof with a trunnion mounting and brace mechanism for supporting the legs in a relatively inclined supporting position, said trunnion mounting including a pivotal connection for allowing the telescopic legs to hang in a generally vertical position when in their collapsed position.

2. The invention according to claim 1 in which there are provided support plates at the lower end of each of the legs.

3. The invention according to claim 1 wherein the drivable chain means is actuated by a hydraulic motor.

4. A trailer-hopper arrangement having means for transporting hoppers and for erecting a hopper upon a mounting means comprising an elongated trailer having a pair of tracks longitudinally disposed thereon for mounting a plurality of hoppers thereon, a drivable chain means to displace the hoppers along said track, a lift mechanism mounted on the trailer to move a hopper with respect to the trailer along a vertical path with respect to the plane of the trailer, each of said hoppers having telescopically constructed leg arrangements to distend into a supporting arrangement for holding the hopper in an upper location after the lift mechanism has displaced the hopper to said position and said legs holding the hopper in said position when the lift mechanism has been removed therefrom, each of the hoppers being provided at the corners thereof with a trunnion mounting and brace mechanism for supporting the legs in a relatively inclined supporting position, said trunnion mounting including a pivotal connection for allowing the telescopic legs to hang in a generally vertical position when in their collapsed position.

5. The invention according to claim 4 in which there are provided support plates at the lower end of each of the legs.

References Cited by the Examiner
UNITED STATES PATENTS

| | | | |
|---|---|---|---|
| Re. 25,443 | 9/1963 | Peterson | 214—515 |
| 2,127,482 | 8/1938 | Fitch | 214—516 |
| 2,670,866 | 3/1954 | Glesby | 214—515 X |
| 2,805,784 | 9/1957 | Dokken | 214—83.36 |
| 2,989,329 | 6/1961 | Noah | 287—103 |
| 3,186,570 | 6/1965 | Bunnell | 214—515 |
| 3,194,419 | 7/1965 | Chorna | 214—516 X |

MARVIN A. CHAMPION, *Primary Examiner.*

ALBERT J. MAKAY, *Examiner.*